July 10, 1934.   G. E. PARKER   1,965,990
FENDER WELL WHEEL CARRIER
Filed July 30, 1932
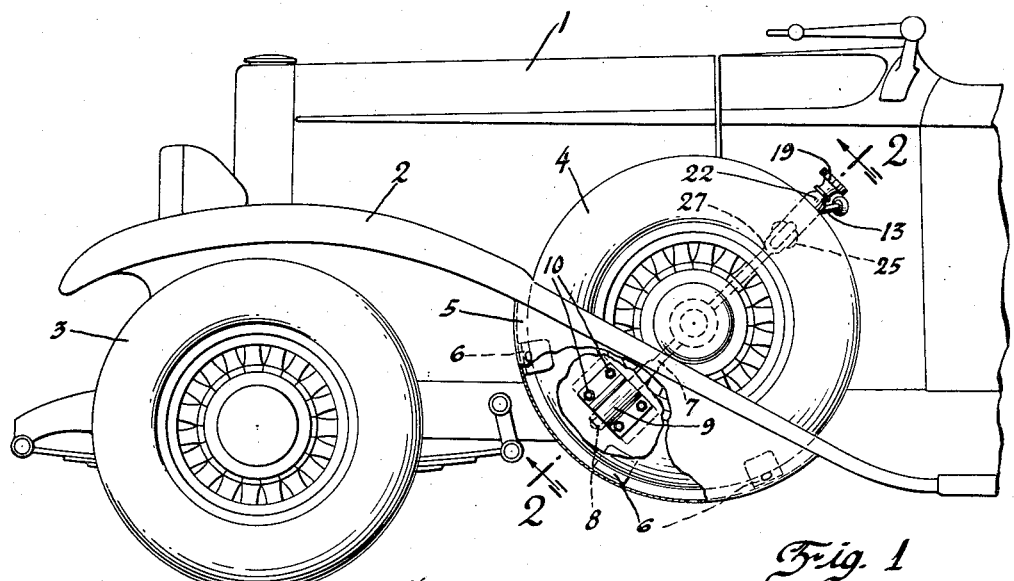
Fig. 1
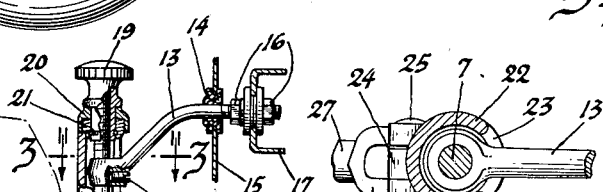
Fig. 3
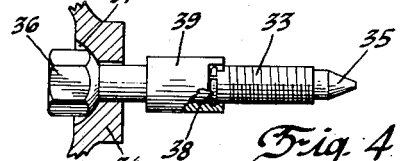
Fig. 4
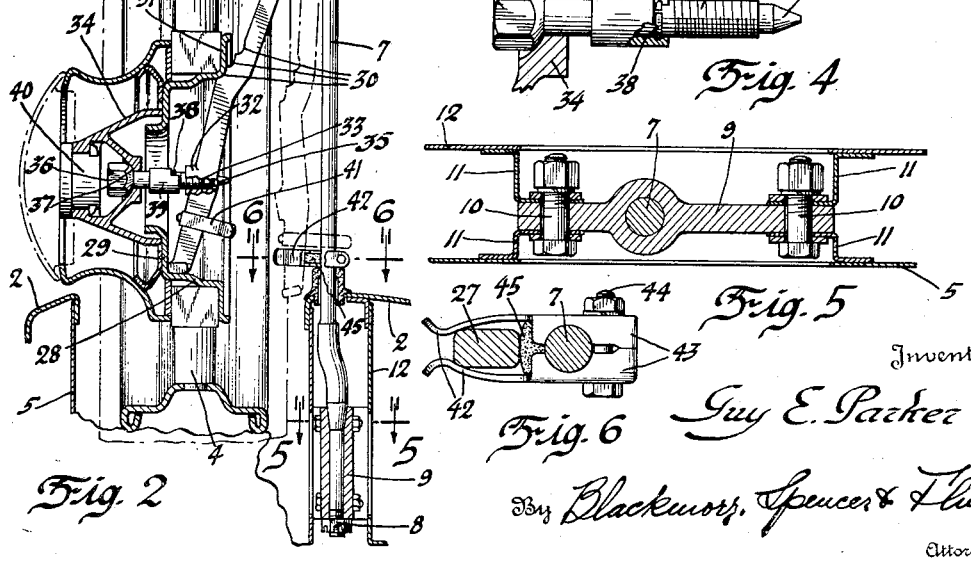
Fig. 2
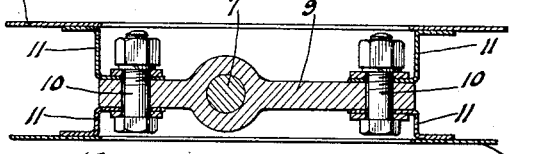
Fig. 5
Fig. 6
Inventor
Guy E. Parker
By Blackmore, Spencer & Flint
Attorneys Patented July 10, 1934

1,965,990

UNITED STATES PATENT OFFICE 1,965,990

FENDER WELL WHEEL CARRIER

Guy E. Parker, Birmingham, Mich., assignor to General Motors Corporation, Detroit, Mich., a corporation of Delaware Application July 30, 1932, Serial No. 626,622

6 Claims. (Cl. 224—29)

This invention relates to motor vehicles, and more particularly to spare tire carriers, especially those of fender well type. Spare or extra tires are often carried at the side of the vehicle and directly over the front fender, the fender generally being provided with a pocket or well which receives or encloses the lower portion of the tire. In some instances, the tire rests directly on the bottom of the well and is clamped downwardly by a retainer that engages the tread at a point diametrically opposite the well. In other cases the weight of the tire is not taken by the fender but is carried by a dummy hub supported from the chassis frame and located above the well.

Where the tire is carried in the well with a retainer clamp engaging its periphery or tread, interference is offered to the use of tire covers, particularly the much favored metal covers. Then too, it is difficult to design a retainer arm to properly fit all kinds and styles of treads or even new and worn treads.

With the dummy hub type of carrier, the fender and tire do not move as a unit upon frame distortion, vibration, jars and the like, and this has a somewhat disturbing effect upon an observer. A more serious objection is the difficulty of mounting or removing the spare tire, such operations being practically impossible because of the interference offered by the hub where there are involved either large and heavy tires that must be rolled into and out of the well or a well so deep that its upper edges come too close to the hub to leave sufficient clearance for the passage of the tire.

With these things in mind, it is here proposed to provide a carrier which will combine to some extent the advantages of the structures before mentioned, and avoid their objectionable features. At the same time, it is proposed to provide a construction which will be simple to design, easy to use and pleasing in appearance.

The invention will be better understood upon reference to the accompanying drawing, wherein Figure 1 is a side elevation of a portion of a motor vehicle with parts of the fender well broken away and shown in section. Figure 2 is a transverse view of the tire holding mechanism and is taken on line 2—2 of Figure 1. Figure 3 is a detailed sectional view on line 3—3 of Figure 2. Figure 4 is a detailed view of the anchorage connection with the spare tire assembly. Firgure 5 is a transverse section on line 5—5 of Figure 2, and Figure 6 is a detailed view of a holding clip between two of the parts and is taken on line 6—6 of Figure 2.

Referring to the drawing, reference numeral 1 indicates an automobile having a fender 2 positioned over a front wheel 3. In this case the front wheel is illustrated as being of the detachable type, which is to say it is removably secured to a hub element rotatably mounted on an axle spindle or shaft, the wheel carrying a rim which supports a pneumatic tire. In the event the tire becomes punctured or otherwise injured, the wheel is removed from the vehicle and replaced by a spare tire assembly, which includes a spare wheel and the injury or damage is repaired at the convenience of the car owner.

In the drawing, a spare tire assembly 4 is shown in a pocket or well 5 forming a part of the fender 2. Suitable cushioning pads 6 may be located within the well for engagement with the tire tread to reduce chafing of the tire surfaces and afford a resilient mounting. Projecting upwardly from the fender on the far side of the well is a mounting element or supporting rod 7, whose lower end projects through the top of the fender and is secured by a nut 8 in an aperture of an attachment bracket 9. The opposite ends of the bracket are fastened as by means of bolts 10 to angular stampings or spacer devices 11, welded or otherwise secured to the side wall of the well and an adjacent cooperating wall 12 projecting downwardly from the fender and beside the pocket or well. At its upper end the rod is braced from the vehicle body by means of a tie bar 13, one end of which projects through a rubber grommet 14 carried by the body panel 15, and is secured by suitable attachment devices or nuts 16 to a structure element 17 of the car body. The opposite end of the tie bar 13 is provided with an eye or apertured head through which the mounting rod 7 extends, use being made of a set screw 18 to secure the parts in properly adjusted position.

The end of the rod 7 beyond the tie bar 13 may be screw threaded for the engagement of a hand nut 19 having a dependent shank projecting through a cap 20 and bearing in a bushing to which it is secured against detachment by a spring band or wire 21. The cap 20 may be secured over the end of a sleeve 22 which is movable longitudinally of the rod 7 upon proper manipulation and adjustment of the nut 19. To prevent removal of the sleeve 22 from the rod 7, it is preferably projected below the brace arm 13 and provided with an elongated slot 23 which slidably receives the brace arm. At its lower end the sleeve 22 is provided with an apertured ear 24 which receives a hinge pin 25 for pivotally mounting, in straddle relation to the ear 24, the forked end 26 of a tire engaging arm 27. The lower end of the arm is adapted to engage with a wheel hub plate 28 in the angle or corner between the plate and an inwardly extending flange 29. Intermediate its ends the arm 27 is provided with one or more seats or notches 30 to engage with the member 28 at the outwardly extending flange 31. The provision of a number of the seats 30 is made to accommodate different types or styles of wheel hubs.

An apertured boss or enlargement 32 in the lower portion of the arm 27 is provided to receive a screw threaded stud or bolt 33 for fastening the same to the wheel through a retainer element 34. This stud is preferably tapered at one end as at 35 to facilitate its engagement in the opening and at the opposite end carries a polygonal head 36 for the engagement therewith of a suitable tool. The underside of the head is rounded to fit the ball seat 37 provided in the retainer 34. Intermediate its ends the stud 33 has secured thereto, by means of a spring wire lock 38, a sleeve or abutment element 39 to prevent accidental separation of the stud from the retainer. Carried by the retainer and overlying the stud head 36 is a lock casing 40, preferably of the key operated type, which when in position will prevent unauthorized access to the fastening stud.

Adjacent its lower end the arm 27 may be provided with a U-shape spring clip 41 for engagement with the mounting rod 7, as illustrated by the broken lines in Figure 2. In like manner the rod 7 may be provided with a keeper to receive the arm 27. This last mentioned keeper may consist, as illustrated in Figure 6, of a pair of stampings, each having a flexible finger 42 at its free end, and an inturned marginal flange 43 at its opposite end to engage with the corresponding flange of the associated stamping. A fastening bolt 44 passes through the two stampings to clamp the same around the rod 7. A buffer 45 of felt, rubber, or the like, may be carried by the keeper for engagement with the arm 27 to prevent rattle and noise.

When a tire carried in the well, as illustrated, is to be removed, it is first necessary to properly actuate the lock mechanism 40 and then remove the retainer 34 by unthreading the stud 33 from the arm 27. The nut 19 is then rotated to shift the sleeve 22 outwardly which allows the arm 27 to swing in to the dotted line position in Figure 2 to clear the wheel. The wheel may now be rolled out of the well.

If for any reason it is desired to operate the car without the spare wheel, the arm 27 will be firmly held in the dotted line position by reason of the spring clips or keepers.

To mount the extra tire in the well it may be rolled into place and after the wheel is properly positioned the arm 27 is swung outwardly about its pivot 25 into engagement with the hub 28. The arm is then connected to the spare wheel by the bolt 33 and upon the proper manipulation of the nut 19 the down thrust is transmitted to the wheel to clamp it in the well. Replacement of the lock housing 40 thereafter prevents theft of the spare tire asembly.

From the above description, it will be apparent that there is provided a mounting which will facilitate the removal and replacement of a spare tire assembly, even though the tire receiving well or pocket be quite deep, hold the wheel as a unit or steady with the fender and present a neat and clean appearance, with most of the operating parts concealed from observation and offering no obstruction to the use of tire covers or the like.

I claim:

1. For holding a spare wheel assembly in a fender well, a tensionable rod extending upwardly on one side of the well to a point adjacent the top of the wheel assembly, a lateral brace arm at the upper end of the rod, a sleeve movable longitudinally of and embracing the rod on both sides of said brace arm, means adjustably engaging said rod to exert downward pressure on said sleeve, a pressure transmitting member extending downwardly from said sleeve and pivoted thereto on an axis transverse to the longitudinal extent of said rod for lateral swinging movement, a pair of spaced seats on the lower end of said member for engaging substantially diametrically opposite portions of the spare wheel hub, and anchoring means for fastening the wheel hub to said member intermediate said seats.

2. A mounting for holding a spare wheel assembly in a fender well, wherein a tensionable rod extends upwardly to adjacent the top of the wheel assembly and is braced by a lateral arm at its upper end, an axially movable sleeve on the rod extending beyond opposite sides of the brace arm and having in a wall thereof intermediate opposite ends an elongated opening to receive the brace arm and define limits of sleeve movement, means adjustably associated with the rod and adapted by its adjustment to exert downward pressure on said sleeve, and a downwardly extending member connected at its upper end with said sleeve and engageable at its lower end with the wheel hub.

3. The combination with a fender well to receive a spare wheel assembly and a tensionable rod extending upwardly to adjacent the upper portion of a spare wheel assembly positioned within the well, of pressure exerting means adjustably mounted on the upper end of the rod for relative axial movement, a downwardly extending bar engageable at its lower end with the hub of a spare wheel assembly and means pivotally connecting the upper end of the bar to said pressure exerting means on an axis transverse to the rod for swinging movement of the bar toward and from said rod.

4. The combination with a fender well to receive a spare wheel assembly and a tensionable rod extending upwardly to adjacent the upper portion of a spare wheel assembly positioned within the well, of a bar extending downwardly from the upper end of said rod for engagement at its lower end with a spare wheel hub, means movable longitudinally of the rod to exert a downward pressure on said bar, and a pivotal connection between said means and the upper end of the bar for the swinging movement of said bar about a transverse axis toward and from the rod.

5. The combination with a fender well to receive a spare wheel assembly and a tensionable rod extending upwardly to adjacent the upper portion of a spare wheel assembly positioned within the well, of a bar extending downwardly from the upper end of said rod for engagement at its lower end with a spare wheel hub, means movable longitudinally of the rod to exert a downward pressure on said bar, and a pivotal connection between said means and the upper end of the bar for the swinging movement of said bar about a transverse axis toward and from the rod, and a spring gripper device engageable with the rod and bar to hold the bar against swinging movement away from the rod.

6. For association with a tensionable rod extending to adjacent the upper portion of a spare wheel assembly positioned in a fender well and having at its upper end a pressure exerting device adjustable longitudinally of the rod, a downwardly extending bar hinged at its upper end to said device on a transverse axis for swinging movement toward and from the rod and adapted to transmit the pressure exerted by said device, and wheel hub engaging means at the lower end of said bar.

GUY E. PARKER.